(No Model.)
A. CONRADT.
NON-CONDUCTING HANDLE FOR TABLEWARE, &c.
No. 494,627. Patented Apr. 4, 1893.
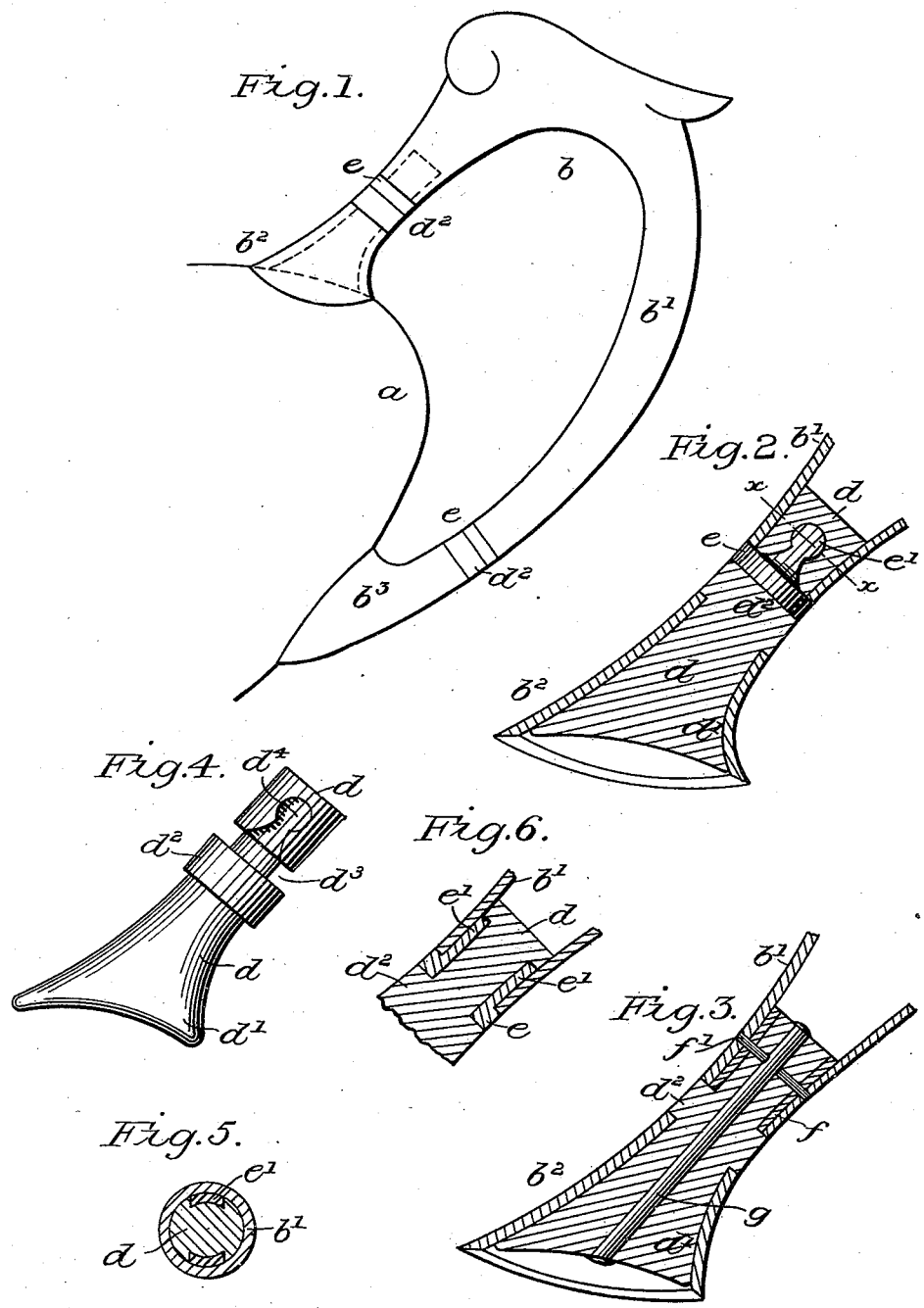

UNITED STATES PATENT OFFICE.

AUGUSTUS CONRADT, OF MIDDLETOWN, CONNECTICUT.

NON-CONDUCTING HANDLE FOR TABLEWARE, &c.

SPECIFICATION forming part of Letters Patent No. 494,627, dated April 4, 1893.

Application filed November 2, 1889. Serial No. 329,017. (No model.)

*To all whom it may concern:*

Be it known that I, AUGUSTUS CONRADT, of Middletown, in the county of Middlesex and State of Connecticut, have invented certain new and useful Improvements in Non-Conducting Handles for Tableware, &c., of which the following is a full, clear, and exact description, whereby any one skilled in the art can make and use the same.

The object of my invention is to provide a handle or like part for a vessel or utensil used for holding hot liquids, a portion of which shall be perfectly insulated from the heated portion of the vessel, and it is particularly to provide such non-conducting elements as are adapted to be used with, and also means for practically securing them to, the different parts composed of the softer kinds of metal and of which plated table ware is to the greater extent made.

My invention consists in the details of the several parts of the sectional handle having the continuity of the metal wholly interrupted or broken by the tennon of non-conducting material and in the securing of such parts together, as more particularly hereinafter described and pointed out in the claims.

Referring to the drawings: Figure 1 is a side view of a handle attached to a vessel and embodying my invention. Fig. 2 is a detail view in section of the handle and the non-conducting tennon at the point where the continuity of the handle, as to the metal portion, is completely broken and with the metallic collar shown in full. Fig. 3 is a detail view of a modified form of my invention. Fig. 4 is a detail view of the non-conducting tenon shown in Fig. 2. Fig. 5 is a detail view in cross section through the clamping arms. Fig. 6 is a detail view in lengthwise section of the device through the clamping arms.

In the accompanying drawings the letter $a$ denotes a hollow vessel or utensil that is adapted for holding liquids, and $b$ the handle, the metallic grip $b'$ of which is separated and insulated from the metallic vessel by the interposition of non-conducting tenons.

My invention finds its greatest use in connection with vessels that are made of brittannia ware, pewter, or such like soft metal that usually forms the base for plated ware, and such handles are usually tubular, that is, are provided with an opening extending more or less completely through them. Such a handle is cut through and through in the direction of its diameter in both branches at a point a short distance from the body of the vessel, and the stumps $b^2$ $b^3$ are secured to the outer wall of the vessel as by soldering in the usual manner.

In the stumps $b^2$ $b^3$ there is preferably secured a tenon $d$, as by casting the metal of the stump around the tenon, the tenon having on its inner end an enlargement $d'$ and midway of its length an annular projection $d^2$. This non-conducting tenon is also provided midway of its length with an annular groove $d^3$ and a longitudinal socket $d^4$ that serve as one means of securing to the tenon a metallic collar $e$ which is secured thereto as by casting the metal, forming the collar about the tenon which may be done by placing the parts in a suitably constructed mold, the metal flowing into and filling the annular groove $d^3$ and socket $d^4$, that portion of the metal flowing into the socket $d^4$ forming clamping arms $e'$ that are integral extensions of the collar $e$. The tenon may be formed of wood, bone or other suitable material that is a good non-conductor of heat and each of the stumps $b^2$ $b^3$ are provided with a similar non-conducting tenon. The tubular ends of the insulated grip $b'$ of the handle are secured to the outer end of the tenon, the ends of the grip fitting closely against the outer side of the metallic collar $e$ to which this grip may be secured as by solder. The grip portion of the handle may be secured to the outer end of the tenon without the use of the metallic collar by passing a rivet pin through and through the grip and tenon and heading over the pin, but in such a construction in use the handle tends to work the head of the rivet loose in a very short time owing to the softness of the metal of which the handle is made.

Instead of using the collar $e$ constructed as above described as a means of securing the several parts together, a bushing $f$ of hard metal as brass may be soldered within the tubular grip and a rivet pin $f'$ be used to hold the handle in place, the hard metal preventing the rivet from working loose.

In order to make sure that the insulated handle shall be of sufficient strength a strengthening strip *g* of metal may be provided extending lengthwise through the center of the tenon, as illustrated in Fig. 3, and when the rivet pin *f'* is used it may or may not extend through said strengthening strip.

In the construction of my device as above described the metallic part forming the grip portion of the handle is entirely separated from the metallic portion forming the stumps which are connected to the vessel, the interposition of the non-conducting material as above described completely and effectually insulating the grip portion from said stems and even in the use strengthening features as above described the grip portion is completely insulated from the stumps, there being no continuity of metal between said stumps and grip portion by the means of which heat will be conducted to said grip portion as in prior devices.

I do not limit myself to the particular means described of securing the metallic collar to the non-conducting tenons as it is obvious that other means may be employed for attaining this result and yet come within my invention; and it is also obvious that the same means for securing the non-conducting tenon in the stumps may be employed as is described for securing the grip portion to the non-conducting portion and vice versa.

In place of the enlargement *d'* on the non-conducting tenon or in addition thereto the tenon may be corrugated or provided with projections or indentations as a means of securing the tenon either to the stumps or to the grip portion of the handle.

I claim as my invention—

1. In combination with a hollow metallic vessel adapted for holding heated liquids, a handle having a metallic grip portion, the stumps secured to the vessel, the non-conducting tenons secured within the stumps as by casting and having an annular projection, and the metallic collar secured to the tenon and serving as a base piece to which the metallic grip of the handle may be united thereby completely insulating the grip portion from the vessel, all substantially as described.

2. In combination with a metallic vessel, a sectional handle composed of a metallic grip portion and of the stump portions, the non-conducting tenon with an annular projection interposed between the ends of the handle sections and provided with a central stiffening piece of metal whereby the metallic grip portion is completely insulated from the vessel, all substantially as described.

AUGUSTUS CONRADT.

Witnesses:
CHAS. L. BURDETT,
ARTHUR B. JENKINS.